(12) United States Patent
Chevance et al.

(10) Patent No.: US 7,408,987 B1
(45) Date of Patent: Aug. 5, 2008

(54) METHOD OF MOTION ESTIMATION FOR TRANSMISSION COST REDUCTION OF MOTION VECTORS

(75) Inventors: Christophe Chevance, Rennes (FR); Pierre Ruellou, Domloup (FR); Dominique Thoreau, Cesson-Sévigné (FR)

(73) Assignee: Thomson Licensing, Boulogne-Billancourt (FR)

(*) Notice: Subject to any disclaimer, the term of this patent is extended or adjusted under 35 U.S.C. 154(b) by 674 days.

(21) Appl. No.: 09/786,432

(22) PCT Filed: Sep. 6, 1999

(86) PCT No.: PCT/EP99/06556

§ 371 (c)(1),
(2), (4) Date: Mar. 5, 2001

(87) PCT Pub. No.: WO00/14682

PCT Pub. Date: Mar. 16, 2000

(30) Foreign Application Priority Data

Sep. 7, 1998  (FR) .................................. 98 11140

(51) Int. Cl.
*H04N 7/18* (2006.01)

(52) U.S. Cl. ...................... 375/240.16; 375/240.17; 348/699; 348/700

(58) Field of Classification Search ............... 375/240.01–240.29; 348/699–702
See application file for complete search history.

(56) References Cited

U.S. PATENT DOCUMENTS

| | | | | |
|---|---|---|---|---|
| 5,193,001 A * | 3/1993 | Kerdranvrat | ................ | 348/701 |
| 5,557,684 A * | 9/1996 | Wang et al. | ................ | 382/107 |
| 5,654,771 A * | 8/1997 | Tekalp et al. | ................ | 348/699 |
| 6,072,542 A * | 6/2000 | Wilcox et al. | ................ | 348/722 |
| 6,178,205 B1 * | 1/2001 | Cheung et al. | ......... | 375/240.29 |
| 6,178,265 B1 * | 1/2001 | Haghighi | ................ | 382/236 |
| 6,195,389 B1 * | 2/2001 | Rodriguez et al. | ..... | 375/240.16 |
| 6,275,532 B1 * | 8/2001 | Hibi et al. | ............ | 375/240.17 |
| 6,317,460 B1 * | 11/2001 | Lee | ............ | 375/240.16 |
| 6,349,114 B1 * | 2/2002 | Mory | ............ | 375/240.21 |
| 6,353,678 B1 * | 3/2002 | Guo et al. | ............ | 382/154 |
| 6,404,813 B1 * | 6/2002 | Haskell et al. | ......... | 375/240.12 |
| 6,438,170 B1 * | 8/2002 | Hackett et al. | ......... | 375/240.16 |
| 6,462,791 B1 * | 10/2002 | Zhu | ............ | 375/240.27 |
| 6,539,058 B1 * | 3/2003 | Pearlstein et al. | ...... | 375/240.25 |

* cited by examiner

*Primary Examiner*—Andy S Rao
(74) *Attorney, Agent, or Firm*—Joseph J. Laks; Paul P. Kiel; Guy H. Eriksen

(57) ABSTRACT

The method includes segmentation of the video image into image blocks, movement estimation per image block in order to obtain a field of movement vectors. It is characterized in that it includes a stage of reassignment of a vector to a block by selecting one movement vector from among N predominant vectors belonging to the field of vectors. The applications relate to movement estimation, for example, by image-block matching.

13 Claims, 3 Drawing Sheets

METHOD OF MOTION ESTIMATION FOR TRANSMISSION COST REDUCTION OF MOTION VECTORS

This application claims the benefit under 35 U.S.C. § 365 of International Application PCT/EP99/06556, filed Sep. 6, 1999, which was published in accordance with PCT Article 21(2) on Mar. 16, 2000 in English, and which claims the benefit of French Application No. 9811140, filed Sep. 7, 1998.

BACKGROUND OF THE INVENTION

Field of the Invention

The invention relates to a method of movement estimation applied to MPEG-type video coding.

SUMMARY OF THE INVENTION

The majority of movement-estimation algorithms implemented in video coding use the technique of "block matching".

The image is segmented into blocks of size N*N, called macroblocks, and the estimator searches for the vector minimizing the difference between a block of the current image and a block of the reference image. This difference is generally an MSE (Mean Square Difference) or MAE (Mean Absolute Difference) calculated on the luminance pixels.

This type of estimator can supply a heterogeneous movement field since it is based on the variations of luminance and not on the actual movement in the sequence. This may entail an overhead for the coding of the vectors by the coder, the coding generally being of differential type, and thus a reduction in performance.

The object of the invention is to remedy the abovementioned drawbacks.

Its subject is a method of movement estimation including segmentation of the video image into image blocks, movement estimation per image block in order to obtain a movement vector field, characterized in that it includes a stage of reassignment of a vector to a block by selecting one movement vector from among N predominant vectors belonging to the vector field.

According to one particular implementation, for a predominant vector, second-order regional maxima are detected so as not to be taken into account during the selection of the other predominant vectors.

According to another implementation, the pre-dominant vectors are selected in each of the four directions.

According to a particular implementation of the method, the selection of the reassigned vector is based on the value of the inter-displaced-image difference (DFD).

A particular characteristic of the invention consists in adopting the zero vector if the DFDs associated with the N predominant vectors are greater than the DFD associated with the original vector, or in actually keeping the original vector if the DFDs associated with the N predominant vectors are greater than the weighted DFD associated with the original vector.

According to another implementation of the method, the selection of the reassigned vector is based on the calculation of the activity (spatial gradient) in the inter-image difference block (current block estimated block). If the activities corresponding to the N predominant vectors are greater than the activity corresponding to the original vector, the zero vector is adopted. If the activities corresponding to the N predominant vectors are greater than the weighted activity corresponding to the original vector, the original vector is kept.

According to another particular implementation of the method, for each image, the predominant vectors are chosen from among the field of vectors of the current image and the field of vectors of at least one preceding image.

By virtue of the invention, the movement vector fields calculated by an estimator of the "block matching" type can be homogenized.

BRIEF DESCRIPTION OF THE DRAWING

The characteristics and advantages of the invention will emerge better from the following description, given by way of example and by reference to the attached figures, in which.

DETAILED DESCRIPTION

The homogenization of the vector field is obtained via a method of conditional reassignment.

The vectors, associated with the images of a sequence, are calculated and stored by the estimator.

In order to carry out processing on the vectors, a two-dimensional histogram is constructed with dimensions of 512*512 in which the coordinates represent the values (dx, dy) which are the values of the horizontal and vertical components of these vectors.

Figure 1:
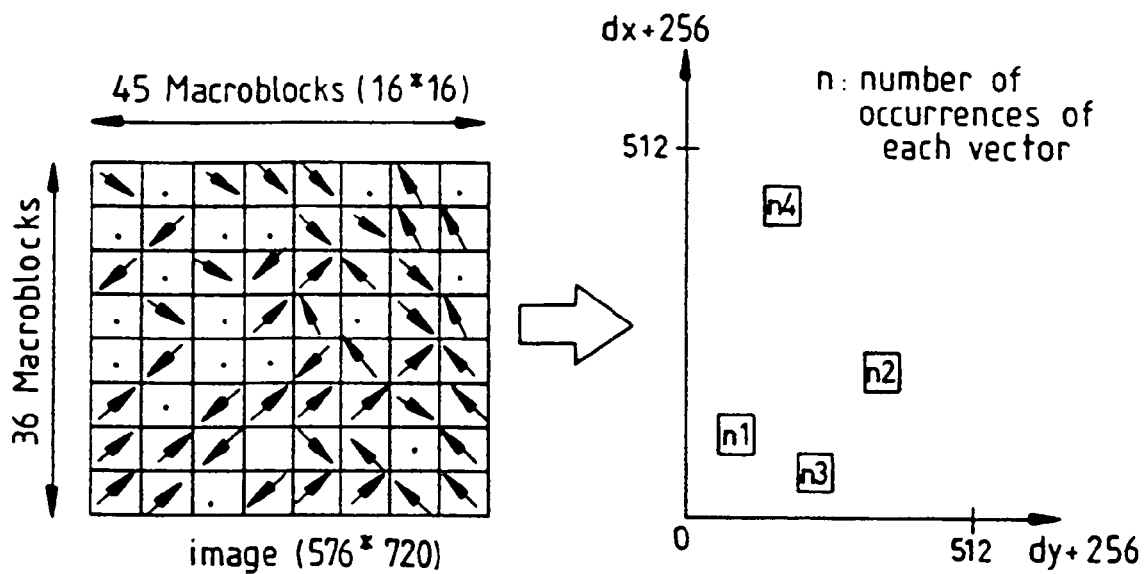
FIG. 1 represents a histogram of the movement vectors.

FIG. 1 represents, on the left-hand part, an image consisting of macroblocks to which the movement vectors are allocated and, on the right-hand part, the corresponding histogram.

Choice of Predominant Vectors

In order to make the movement field more homogeneous, the idea is to adopt a certain number of vectors, which is fixed in the first place by the user. This number will be larger in proportion to the heterogeneity of the movements.

The first solution consists in adopting the N vectors corresponding to the highest frequencies of appearance.

Another possibility is to stipulate that the algorithm choose N/4 predominant vectors in each of the four orientation planes. This solution can be adopted as an option, as an output criterion upon detection of zoom in the sequence. This is because such a phenomenon entails distribution in all directions of the vector field.

The last solution envisaged is to carry out detection of the regional maxima. This is because the problem, in the first solution, is that it is possible to have several contiguous maxima, which do not confer enormous advantages compared with the fact of adopting fewer of them.

The histogram is therefore scanned, rejecting those vectors among the N predominant vectors appearing in the vicinity of other more predominant vectors. Thus the existence of these second-order maxima is identified by looking at the histogram to see whether two maxima lie in the same window, for example with dimensions 3*3.

Figure 2:
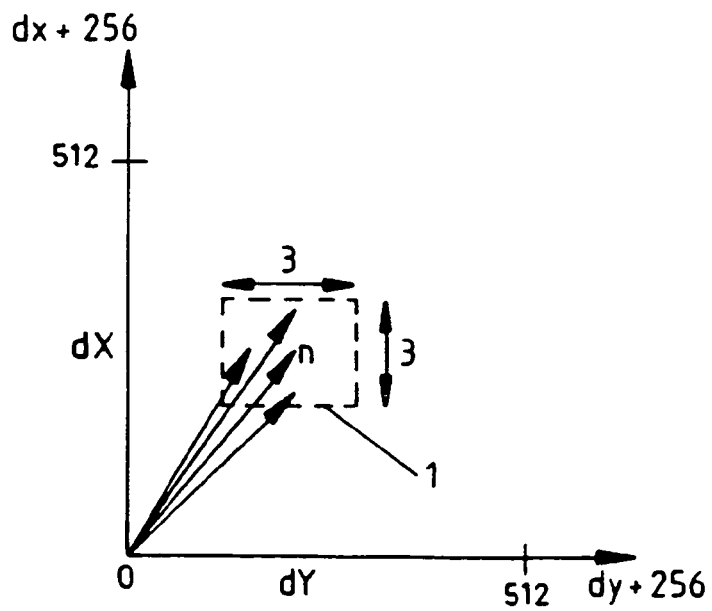
FIG. 2 represents a regional-maxima search window.

FIG. 2 represents such a window, referenced 1, for searching for regional maxima, this window being centred around the predominant vector adopted (dX, dY), the number of occurrences of which is n.

Choice of the Vector Allocated to a Macroblock MB. Reassignment

Method of the DFD

Once the predominant vectors have been extracted, a criterion remains to be found for reassigning each of these vectors to each MB. Since the movement estimator uses the criterion of the minimum DFD (Displaced-Frame Difference) to calculate the movement vectors, it seems useful to use this criterion to find the best possible correspondence between the vectors adopted and the macroblocks of the image to be processed.

After ordering the vectors in increasing order of their frequency of appearance, the calculation of DFD associated with each of these vectors is carried out for each MB. This calculation can be expressed simply by the following formula:

$$Dfd(i, j) = \sum_{k=0}^{N-1}\sum_{l=0}^{N-1} |MBCurrent(i+k, j+l) - MBReference(i+k+dy, j+l+dx)|$$

in which (i, j) are the coordinates of the MB to be processed;

N (=16) is the size of the MB;

(dx, dy) are the components of the vector to be tested, belonging to [−128; +127.5].

It is important, before applying this formula, to check that the vector to be tested does not point outside the reference image. If no vector is suitable, then the zero vector is assigned.

Hence the vector corresponding to the minimum DFD is assigned to each MB.

Gradient Method

This consists in seeking, for each MB of the "difference" image consisting of the predicted reference image and of the current image, the vector corresponding to the minimum gradient which gives information on the local activity of the MB (of horizontal and vertical gradient type).

$$MB\_gradient = \sum_{4luma\ blocks} block\_active$$

with:

$$block\_active = MAX\left(\underset{i,j=0}{\overset{i=6,j=7}{MAX}}|x(i, j) - x(i+1, j)|, \underset{i,j=0}{\overset{i=7,j=6}{MAX}}|x(i, j) - x(i, j+1)|\right)$$

Enhancement of the Reassignment

DFD/Gradient Criterion

In order to keep certain movements, relating to objects of small size, the following criterion is defined:

If, after application of the DFD method, the vector adopted for an MB generates a DFD greater than the weighted original DFD, the original vector is kept.

Likewise, regarding the method of the gradient, for each MB obtained after inter-image difference, the gradient obtained by reassignment is compared with the gradient of the original vector. If the weighted original gradient is less than the new gradient, the original vector is kept.

Filtering Applied to the Movement Vectors

In order to make the vector fields more homogeneous, other criteria may be used, namely spatial or temporal filtering.

Spatial Filtering

Figure 3:
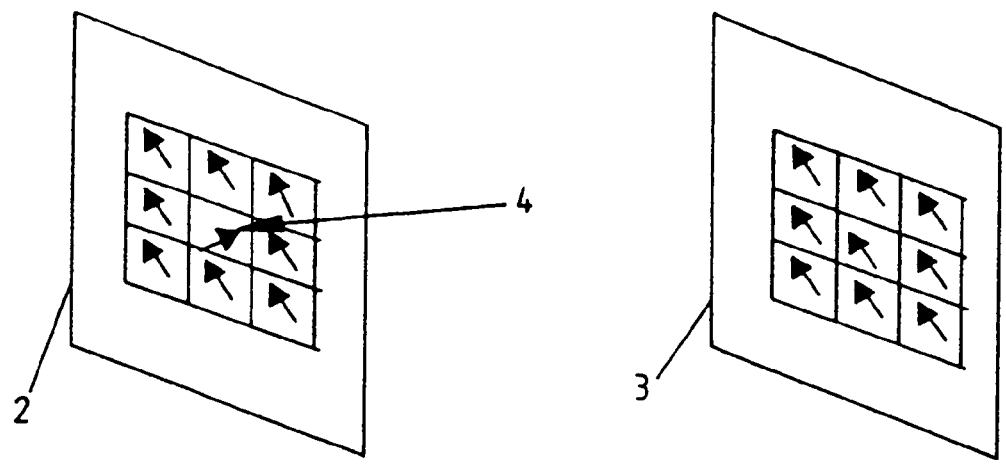
FIG. 3 represents an example of median filtering.

The filter adopted is the two-dimensional 3*3 median filter:

the principle is explained below in the light of FIG. 3 which represents an image referenced 2 before filtering and an image referenced 3 after filtering. The vector referenced 4 is the vector to be processed.

The vertical and horizontal neighbours of the components of the MB in question are ordered along each direction (dx, dy), then the median value of each component is taken. Next the various DFDs associated with each MB are compared, in the case in which either one component is filtered, or both, or no component is filtered. Hence the vector corresponding to the minimum DFD is chosen, the original DFD, obviously, being weighted.

Temporal Filtering

The idea of temporal coherence is to take account, in the reassignment of the vectors of an image, of the movement fields of the preceding images; this is done with a view to limiting the disparity in the movements from one image to another.

To begin with, we will detail the principle of temporal filtering of Forward vectors (deferred-movement vectors).

Spatio-Temporal Histogram of Forward Vectors:

In order to take account of the various histograms, scaling of the vectors is carried out at a first stage, then weighting of the occurrences which is a function of the position of the various histograms with respect to the histogram processed.

Figure 4:
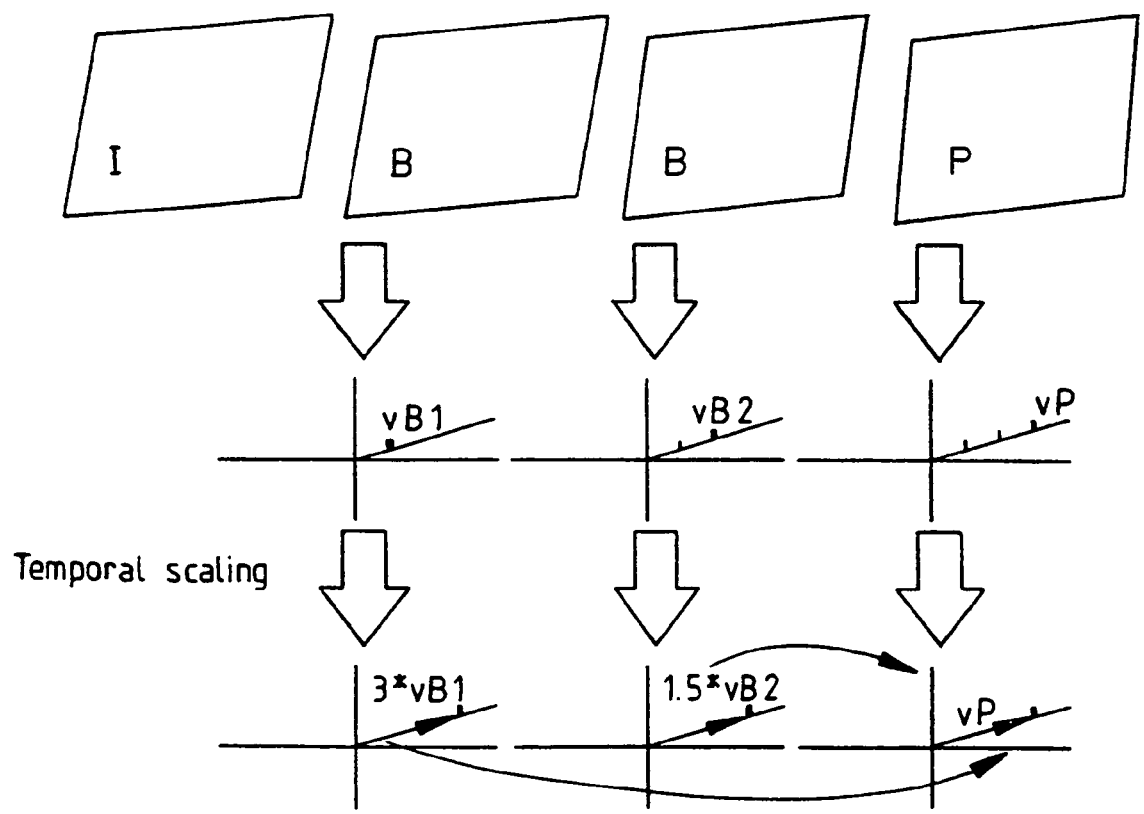
FIG. 4 represents an example of the preceding image vectors being taken into account.

Hence, for the P image of FIG. 4, it is possible to add to the histogram of original vectors, the occurrences of which have been weighted by a factor 3, the occurrences of the vectors of the first B (the amplitude of which has been multiplied by 3) which are weighted by a factor 1 as well as the occurrences of the vectors of the second B (the amplitude of which has been multiplied by ½) which are weighted by a factor 2.

Temporal coherence should be relevant when uniform movements are present, and breaks in movement (change of scene) are not present.

Case of Backward Vectors (Anticipated-Movement Vectors)

It would be logical to think that, if there are uniform "Forward" movements from one image to the next, they would also be present in the case of the "Backward" vectors associated with the B images. In order to filter the latter, it must not be forgotten that the Backward vectors are based on the P or the I which will follow the B in question. Hence, for the first B, it may be thought that its Backward vectors will be twice as large as the Backward vectors associated with the second B. Scaling is carried out on the vectors of the latter by a factor of 2, and the weighted occurrences will be added, in the histogram associated with the first B.

Detection of Uniform Field

The idea of applying the reassignment with N vectors on sequences with multidirectional movements such as a zoom, for example, is not relevant. This is because, in this fairly specific case, the fact of adopting only N predominant vectors does not make it possible conveniently to process the fields consisting of multiple vectors.

Figure 5:
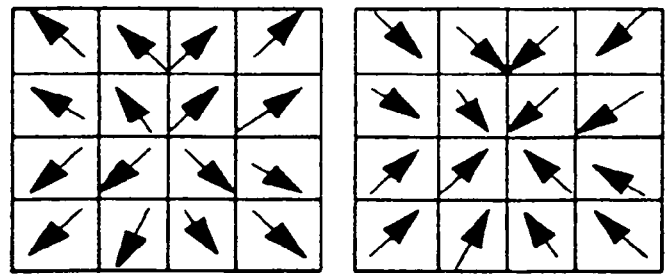
FIG. 5 represents movement-vector fields during a zoom.

FIG. 5 represents the image of the vectors during the zoom. It can easily be seen that the disparity in the field does not allow any such uniformity.

It is therefore decided to detect, in the first place, a field in which the vectors are uniformly distributed, either unilaterally, or in all directions (zoom). This detection is conveyed by a standard deviation of the first predominant vector close to the average standard deviation calculated from among the N predominant vectors. This is expressed as:

if $\sigma 1 \leq$ threshold*$\sigma$average=>uniform field present in which the threshold is fixed by the user (threshold=1.34 for example).

Figure 6:
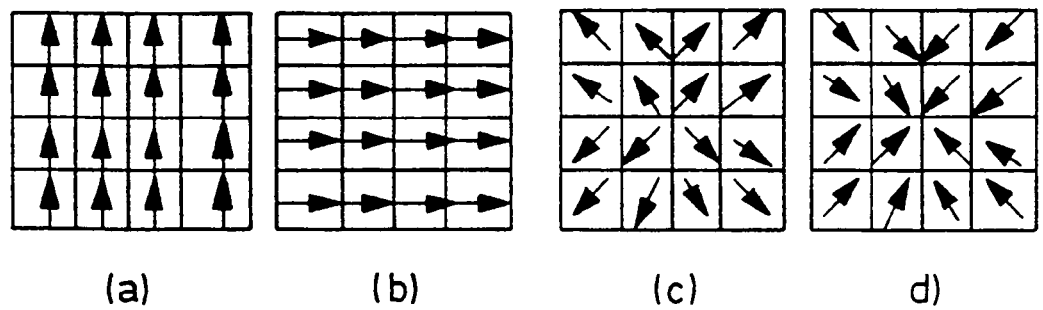
FIG. 6 represents various types of movement which may be detected.

Examples relating to the types of movements which are successfully detected are represented in FIGS. 6a, b, c, d.

The objective is, at present, not to apply the algorithm when cases (c) and (d) are present. These cases have still to be distinguished from cases (a) and (b). To do that the average values of the dx and dy movements are examined, from among the N adopted, and it is seen whether they are close to zero. This is because it may be observed that the movements in a zoom seem to cancel out if they are added, in contrast to unilateral movement. A maximum difference of five pixels can be set for dx, dy.

Limitation on the Temporal Filtering

It is useful not to have to filter the histograms temporally in the event of breaks in movement. It is possible:
to store the histogram of initial or reassigned vectors for a P-type image;
at the next P-type image, P (t), the new "image" vectors are compared. If they differ too much from their counterparts arising from P (t−n), the original vectors are kept.

Choice of the Number of Predominant Vectors

The number of vectors necessary may be decided automatically and dynamically, in such a way that, for sequences with random movements (for example a sporting sequence), there are more vectors than for sequences with uniform movements ("train")

The invention claimed is:

1. Method of movement estimation for a sequence of images including segmentation of a current video image into image blocks, movement estimation per image block between the current image and a previous image in order to obtain a movement vector field for said current image, a stage of reassignment of a vector to a block by selecting one movement vector from among N predominant vectors, wherein the predominant vectors are the ones of the group of vectors belonging to the movement vector field for said current image and at least to the movement vector field for a preceding image corresponding to a movement vector field between said preceding image and a further preceding image, the vectors being scaled according to the temporal distance to which they correspond.

2. Method according to claim 1, wherein, for a predominant vector, second-order regional maxima are detected so as not to be taken into account during the selection of the other predominant vectors.

3. Method according to claim 1, wherein the predominant vectors are selected in each of four directions.

4. Method according to claim 1, wherein the selection of the reassigned vector is based on the value of a displaced frame difference (DFD).

5. Method according to claim 4, wherein, if the DFDs associated with the N predominant vectors are greater than the DFD associated with the original vector, a zero vector is adopted.

6. Method according to claim 4, wherein, if the DFDs associated with the N predominant vectors are greater than the weighted DFD associated with the original vector, the original vector is kept.

7. Method according to claim 1, wherein the selection of the reassigned vector is based on the calculation of the activity (spatial gradient) in the inter-image difference block (current block-estimated block).

8. Method according to claim 7, wherein, if the activities corresponding to the N predominant vectors are greater than the activity corresponding to the original vector, the zero vector is adopted.

9. Method according to claim 7, wherein, if the activities corresponding to the N predominant vectors are greater than the weighted activity corresponding to the original vector, the original vector is kept.

10. Method according to claim 4, wherein the components of the vectors used during the DFD calculations are spatially filtered components.

11. Method according to claim 7, wherein the components of the vectors used during the spatial-gradient calculations are the spatially filtered components.

12. Method according to claim 1, wherein the vectors of the preceding images, in addition to being scaled, are weighted as a function of the temporal distance.

13. Method according to claim 1, wherein, when a break in movement is detected, the vectors of the preceding images are not considered.

* * * * *